(12) United States Patent
Malhotra et al.

(10) Patent No.: US 8,990,428 B2
(45) Date of Patent: Mar. 24, 2015

(54) SYSTEM AND METHOD FOR FACILITATING COMMUNICATION BETWEEN DIFFERENT PROTOCOL STACKS VIA VIRTUAL COMMUNICATION DEVICES

(75) Inventors: Lakshya Malhotra, New Delhi (IN); Kumar Padmanabh, Bangalore (IN); Sanjoy Paul, Bangalore (IN)

(73) Assignee: Infosys Limited (IN)

( * ) Notice: Subject to any disclaimer, the term of this patent is extended or adjusted under 35 U.S.C. 154(b) by 421 days.

(21) Appl. No.: 13/233,197

(22) Filed: Sep. 15, 2011

(65) Prior Publication Data

US 2013/0007199 A1 Jan. 3, 2013

(30) Foreign Application Priority Data

Jun. 30, 2011 (IN) .......................... 2212/CHE/2011

(51) Int. Cl.
*G06F 15/16* (2006.01)
*H04J 3/00* (2006.01)
*H04J 3/16* (2006.01)
*H04L 29/06* (2006.01)
*H04W 4/00* (2009.01)
*H04L 29/08* (2006.01)

(52) U.S. Cl.
CPC .............. *H04L 69/08* (2013.01); *H04W 4/005* (2013.01); *H04L 69/32* (2013.01)
USPC ........... 709/246; 370/466; 370/464; 370/465; 370/467

(58) Field of Classification Search
USPC .................................. 709/223; 370/466, 467
See application file for complete search history.

(56) References Cited

U.S. PATENT DOCUMENTS

| 6,873,620 | B1 * | 3/2005 | Coveley et al. .......... 370/395.31 |
| 7,852,860 | B2 * | 12/2010 | Aizu et al. ..................... 370/401 |
| 2010/0030881 | A1 * | 2/2010 | Moreira Sa de Souza et al. ............................. 709/223 |

* cited by examiner

*Primary Examiner* — Shirley Zhang
(74) *Attorney, Agent, or Firm* — Lerner, David, Littenberg, Krumholz & Mentlik, LLP (57) ABSTRACT

A computer-implemented method for facilitating interoperation between communication devices of different networks following different protocols is provided. The computer-implemented method enables creating a virtual device. The virtual device is a software representation of a first communication device in a first network. The computer-implemented method further comprises linking a synchronization module within the virtual device to the first communication device. The synchronization module receives data related to one or more attributes of the first communication device. The computer-implemented method comprises linking at least one mapping module within the virtual device to a second communication device. The mapping module facilitates conversion of the received data and transmission of the converted data to the second communication device for facilitating interoperation therebetween.

25 Claims, 4 Drawing Sheets

SYSTEM AND METHOD FOR FACILITATING COMMUNICATION BETWEEN DIFFERENT PROTOCOL STACKS VIA VIRTUAL COMMUNICATION DEVICES

FIELD OF THE INVENTION

The present invention relates generally to the field of data communication between networks following different protocols and more specifically to a system and method for facilitating protocol conversion at application layers of different protocol stacks by creating virtual devices for communication devices.

BACKGROUND OF THE INVENTION

Various communication devices exist that operate in various networks using specific protocols. The communication devices are manufactured by different manufacturers or vendors and follow different protocols which govern their operation in their networks respectively. Protocols are processed by protocol stacks which are a set of network protocol layers as defined by network models such as Open Systems Interconnection (OSI) model and Transmission Control Protocol/Internet Protocol (TCP/IP) model. Typically, in a network, the process of communication includes data passing through each layer in the protocol stack. Such process of communication is unique for a specific protocol and is a complex process. Therefore, a communication device following a particular protocol cannot interoperate with another communication device following a different protocol. For, the communication devices to interoperate, different protocols are required to communicate with each other.

Conventionally, translators may be used to convert one protocol in one network to another protocol in another network and vice versa for facilitating communication between communication devices in different networks. Such a protocol conversion takes place when data is passed from application layer through every other layer to physical layer of one protocol stack and then converted back to the other protocol by passing the data from physical layer through every other layer till the application layer of the other protocol stacks. Since all the layers of the protocol stacks are involved during conversion, computational load and time involved is more which in turn may degrade overall performance. Moreover, such systems are complex as more number of translators are required if number of protocols to be converted are increased.

In light of the abovementioned disadvantages, there is a need for a system and method which facilitates seamless communication between communication devices following different protocols in different networks, using a common communication infrastructure. Further, there is a need for a system and method which facilitates conversion of one protocol to another protocol by involving only the topmost layer i.e. the application layer of the network layers in the networks. Furthermore, there is a need for a system and method which facilitates converting one protocol to another protocol in, for example, two different networks by creating a virtual device for one of the two communication devices from either of the networks. Also, there is a need for a system and method with minimum complexity and processing time.

SUMMARY OF THE INVENTION

A computer-implemented method for facilitating interoperation between communication devices of different networks following different protocols is provided. In an embodiment of the present invention, the computer-implemented method comprises creating a virtual device. The virtual device is created using program instructions executed by a microprocessor on a computer system. The virtual device is a software representation of a first communication device in a first network. The computer-implemented method further comprises linking, via the computer system, a synchronization module within the virtual device to the first communication device. The synchronization module receives data related to one or more attributes of the first communication device. The computer-implemented method comprises linking, via the computer system, at least one mapping module within the virtual device to a second communication device. The mapping module facilitates conversion of the received data and transmission of the converted data to the second communication device for facilitating interoperation therebetween.

In another embodiment of the present invention, the computer-implemented method further comprises extracting one or more parameters of the first communication device. The one or more parameters are extracted via program instructions executed by the microprocessor. In yet another embodiment of the present invention, the computer-implemented method comprises representing the one or more parameters, by program instructions executed by the microprocessor, as one or more attributes in the virtual device.

In an embodiment of the present invention, the mapping module facilitates converting, via program instructions executed by the microprocessor, the data related to the one or more attributes of the first communication device received from the synchronization module to data related to one or more equivalent attributes of the second communication device. In another embodiment of the present invention, the mapping module facilitates transmitting the converted data, via the computer system, to the second communication device. The converted data facilitates interoperation between the second communication device and the first communication device.

In an embodiment of the present invention, linking the synchronization module within the virtual device to the first communication device comprises linking the synchronization module, via the computer system, to application layer of the first communication device. In another embodiment of the present invention, linking at least one mapping module within the virtual device to a second communication device comprises linking the at least one mapping module, via the computer system, to application layer of the second communication device.

A computer-implemented method that facilitates converting data of a first communication device in a first network to data of a second communication device in a second network to facilitate interoperation therebetween. In an embodiment of the present invention, the computer-implemented method comprises receiving data related to an attribute of a first communication device in a first network via a virtual device on a computer system. The computer-implemented method further comprises identifying, by the virtual device, an attribute of the second communication device based on the received data. The attribute of the second communication device is equivalent to the attribute of the first communication device. Further, the computer-implemented method comprises mapping, by the virtual device, the identified equivalent attributes. Furthermore, the computer-implemented method comprises converting, by the virtual device, the received data related to the attribute of the first communication device to data related to the equivalent attribute of the second communication device. The received data is converted using predetermined protocol specific information related to the equivalent attribute of the second communication device. The computer-implemented method further comprises transmitting, by the virtual device on the computer system, the converted data to the second communication device.

In an embodiment of the present invention, the computer-implemented method further comprises receiving, by the virtual device, updated data related to the attribute of the first communication device.

A system for facilitating interoperation between communication devices of different networks following different protocols is provided. In an embodiment of the present invention, the system comprises a parameter extraction module configured to extract one or more parameters related to a first communication device in a first network. The parameter extraction module is in communication with a microprocessor on a computer system. The system further comprises a virtual device. The virtual device is a software representation of the first communication device. Further, the virtual device is configured to convert data related to the one or more parameters of the first communication device to data related to one or more equivalent parameters of a second communication device and transmit the converted data to the second communication device for facilitating interoperation between the first communication device and the second communication device. The virtual device is in communication with the microprocessor on the computer system.

In an embodiment of the present invention, the virtual device is further configured to represent the extracted one or more parameters as one or more attributes of the first communication device. In another embodiment of the present invention, the virtual device comprises a synchronization module. The synchronization module, in communication with the microprocessor on the computer system, is configured to receive data related to the one or more attributes of the first communication device from the first communication device and send the received data to a mapping module in the virtual device.

In another embodiment of the present invention, the mapping module, in communication with the microprocessor on the computer system, is configured to receive data related to the one or more attributes of the first communication device from the synchronization module. The mapping module is further configured to identify one or more attributes of a second communication device that are equivalent to the one or more attributes of the first communication device. Furthermore, the mapping module is configured to map the identified one or more equivalent attributes. The mapping module is further configured to convert the received data related to the one or more attributes of the first communication device to data related to the identified equivalent attributes of the second communication device. The data is converted using protocol specific information related to the identified equivalent attributes of the second communication device that are predetermined in the mapping module. The mapping module is configured to transmit the converted data to the second communication device.

A computer program product comprising computer-readable medium having computer-readable program code stored thereon is provided. In an embodiment of the present invention, the computer-readable program code comprises instructions that, when executed by a computer system, cause the computer system to create a virtual device. The virtual device is a software representation of a first communication device in a first network. Further, the computer-readable program code comprises instructions that, when executed by a computer system, cause the computer system to link a synchronization module within the virtual device to the first communication device. The synchronization module receives data related to one or more attributes of the first communication device. Furthermore, computer-readable program code comprises instructions that, when executed by a computer system, cause the computer system to link at least one mapping module within the virtual device to a second communication device. The mapping module facilitates conversion of the received data and transmission of the converted data to the second communication device for facilitating interoperation therebetween.

In another embodiment of the present invention, the computer-readable program code further comprises instructions that, when executed by the computer system, cause the computer system to extract one or more parameters of the first communication device and represent the one or more parameters as one or more attributes in the virtual device.

In yet another embodiment of the present invention, the computer-readable program code further comprises instructions that, when executed by the computer system, cause the computer system to convert the data related to the one or more attributes of the first communication device received from the synchronization module to data related to one or more equivalent attributes of the second communication device and transmit the converted data to the second communication device. The converted data facilitates interoperation between the second communication device and the first communication device.

In another embodiment of the present invention, the computer-readable program code further comprises instructions that, when executed by the computer system, cause the computer system to link the synchronization module to application layer of the first communication device. In yet another embodiment of the present invention, the computer-readable program code further comprises instructions that, when executed by the computer system, cause the computer system to link the at least one mapping module to application layer of the second communication device.

A computer program product comprising computer-readable medium having computer-readable program code stored thereon is provided. In an embodiment of the present invention, the computer-readable program code comprising instructions that, when executed by a computer system, cause the computer system to receive data related to an attribute of a first communication device in a first network via a virtual device on a computer system. The computer-readable program code further comprises instructions that, when executed by a computer system, cause the computer system to identify an attribute of the second communication device based on the received data. The attribute of the second communication device is equivalent to the attribute of the first communication device. The computer-readable program code further comprises instructions that, when executed by a computer system, cause the computer system to map the identified equivalent attributes and convert the received data related to the attribute of the first communication device to data related to the equivalent attribute of the second communication device. The received data is converted using predetermined protocol specific information related to the equivalent attribute of the second communication device. Furthermore, the computer-readable program code comprises instructions that, when executed by a computer system, cause the computer system to transmit the converted data to the second communication device.

In an embodiment of the present invention, the computer-readable program code further comprises instructions that, when executed by the computer system, cause the computer system to receive updated data related to the attribute of the first communication device.

BRIEF DESCRIPTION OF THE DRAWINGS

The present invention is described by way of embodiments illustrated in the accompanying drawings wherein.

DETAILED DESCRIPTION

A system and method is provided that facilitates seamless communication between communication devices attached to different networks following different protocols via a virtual system. The invention provides for conversion of one protocol stack into one or more different protocol stacks by performing operation through the topmost layer of layered network architecture of the networks. Also, the invention provides for creating virtual device for one of the communication devices communicating with each other in the networks. The interoperation between the various communication devices takes place via protocol conversion in the virtual device. Furthermore, the invention facilitates providing a common communication infrastructure that facilitates multiple numbers of communication devices manufactured by different vendors and manufacturers in different networks to communicate with each other.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
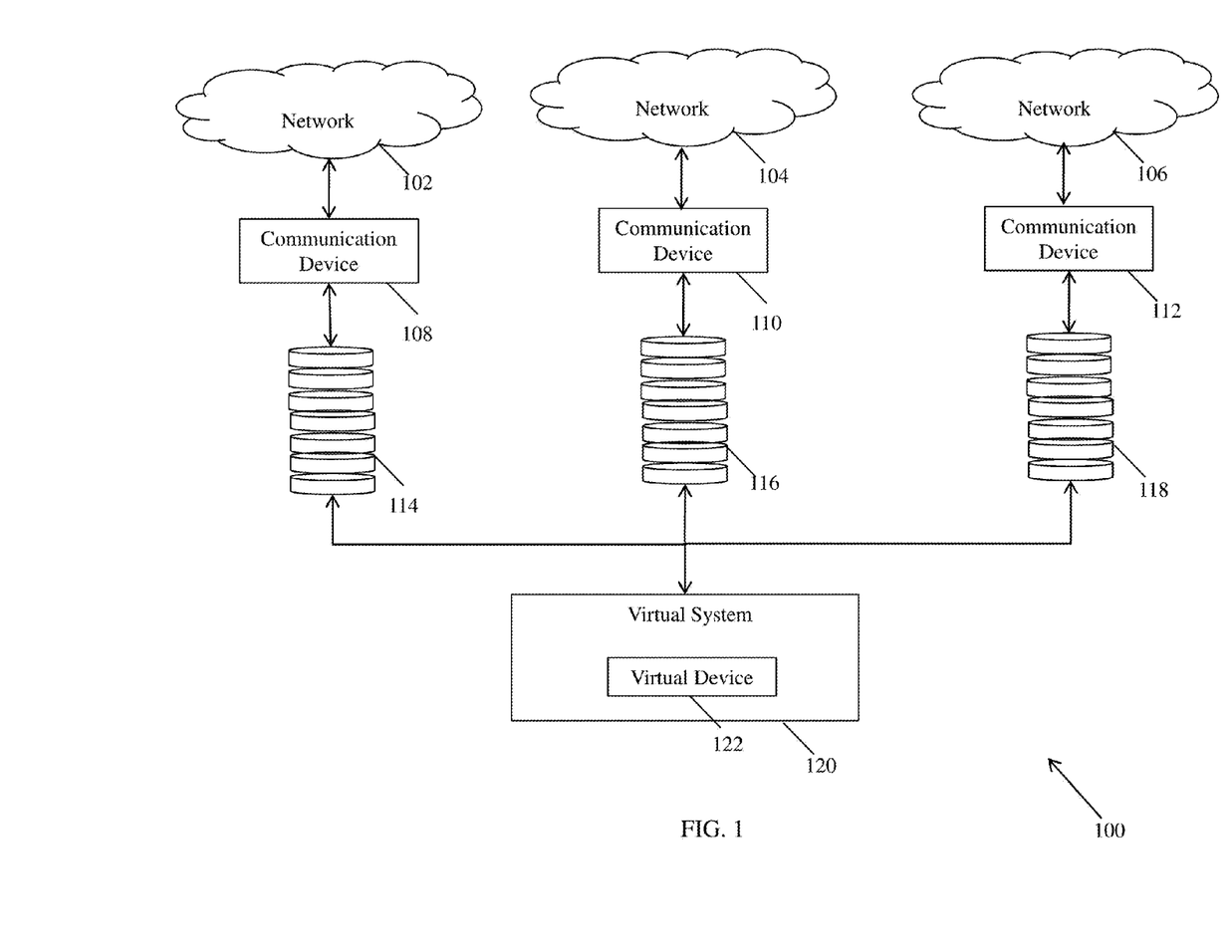
FIG. 1 illustrates a system environment in which a virtual system in accordance with various embodiments of the present invention operate.

FIG. 1 illustrates a system environment in which a virtual system in accordance with various embodiments of the present invention operate.

In various embodiments of the present invention, the system environment depicts multiple networks. Each network comprises one or more communication devices that communicate within corresponding networks using a specific protocol. The specific protocol in each network is processed by respective layered protocol stacks which correspond to either OSI model or TCP/IP model. For example, the network may include a wireless sensor network which comprises one or more communication devices such as sensors that sense and control physical conditions of a building such as heating, lighting, cooling etc. Examples of sensors include temperature sensor, light sensor, image sensor etc. The sensors may operate within the wireless sensor network using a Zigbee protocol which is a protocol typically used in any wireless sensor network to make one or more sensors communicate with each other. The wireless sensor network may be deployed as a security system at a building premise. Another network may include a building automation and control network which may include communication devices such as sensors for controlling heating, ventilation, access control, and fire detection etc. in a building premise. BACnet data communication protocol may be used for such building automation and control within the network.

In an embodiment of the present invention, as shown in FIG. 1, one communication device 108 in a first network 102 may operate with another communication device 110 in a second network 104 and another communication device 112 in a third network 106. The communication device 108 in the first network 102 follows a protocol which is different from protocols followed by the other communication devices 110 and 112. The protocols in the first, second and third network 102, 104, 106 are processed by respective protocol stacks 114, 116 and 118. In an exemplary embodiment of the present invention, the protocol stacks 114, 116 and 118 correspond to the seven network protocol layers as defined by the OSI model.

In operation, in an exemplary embodiment of the present invention, when the communication device 108 interoperates with the other communication devices 110 and 112, data flows into the first, second and third networks 102, 104 and 106. The data passes through each layer of the protocol stacks 114, 116, and 118 that define the protocol, but, are converted to the other protocols only at the topmost layer i.e. the application layer of the layered protocol stacks 114, 116, 118 of each network 102, 104 and 106. The data is converted at the application layer itself to a format that is readable by other communication devices 110 and 112 based on the protocols followed in their respective first and second network 104, 106.

In an embodiment of the present invention, such a protocol conversion at the application layer is carried out by a virtual system 120. The virtual system 120 is a software representation of any one of the communication devices 108, 110, 112 and is synchronized with that particular communication device. In an embodiment of the present invention, the virtual system 120 comprises a virtual device 122 corresponding to the communication device 108. The virtual device 122 is a software object in any one of object oriented programming languages such as JAVA. In an exemplary embodiment of the present invention, the virtual system 120 may be created using program instructions executed by a microprocessor on a computer system. For example, the microprocessor may include an intel atom 1.6 GHz microprocessor which is capable of executing program instructions written in JAVA and capable of running on a Java Virtual machine (JVM).

In another embodiment of the present invention, the virtual system 120 provides a common communication infrastructure via which the communication device 108 can interoperate with communication devices 110 and 112. The virtual system 120 facilitates controlling and manipulating data related to any one of the communication devices 108, 110 and 112 virtually, using program instructions executed by the microprocessor on the computer system. Data from the application layers of the layered protocol stacks 114, 116, 118 of each of the first, second and third network 102, 104 and 106 flows into the virtual device 122 within the virtual system 120. The data flow is carried out by linking the application layers of the layered protocol stacks 114, 116, 118 of each of the first, second and third network 102, 104 and 106 to the virtual system 120. In an exemplary embodiment of the present invention, the application layers may be linked to the virtual system 120 via one or more interface ports on the computer system. The one or more interface ports further facilitate data from the application layers to flow into the virtual device 122 inside the virtual system 120.

In another embodiment of the present invention, protocol specific information corresponding to the protocols defined by the layered protocol stacks 114, 116, 118 may be configured into the virtual system 120 via the one or more interface ports on the computer system. In various embodiments of the present invention, the virtual system 120 facilitates converting the data of the communication devices 108, 110, 112 and facilitates the communication device 108 and the other communication devices 110 and 112 to interoperate.

In operation, in an exemplary embodiment of the present invention, the virtual device 122 converts data following a protocol which is defined by protocol stack 114 to data following different protocols which are defined by protocol stacks 116 and 118 using the protocol specific information configured in the virtual device 122. Such a conversion facilitates interoperation between the communication device 108 and the other communication devices 110 and 112. Further, the virtual device 122 is in synchronization with the communication device 108 such that the flow of data and updating of data take place in real time. The second and third networks 104, 106, therefore, perceive the communication device 108 as it is present in their local networks. The protocol conversion takes place in such a manner that when the communication devices 108, 110 and 112 in the first, second and third networks 102, 104 and 106 interoperate, the other layers of the protocol stack such as the physical layer, data link layer and network layer etc. are not involved.

Figure 2:
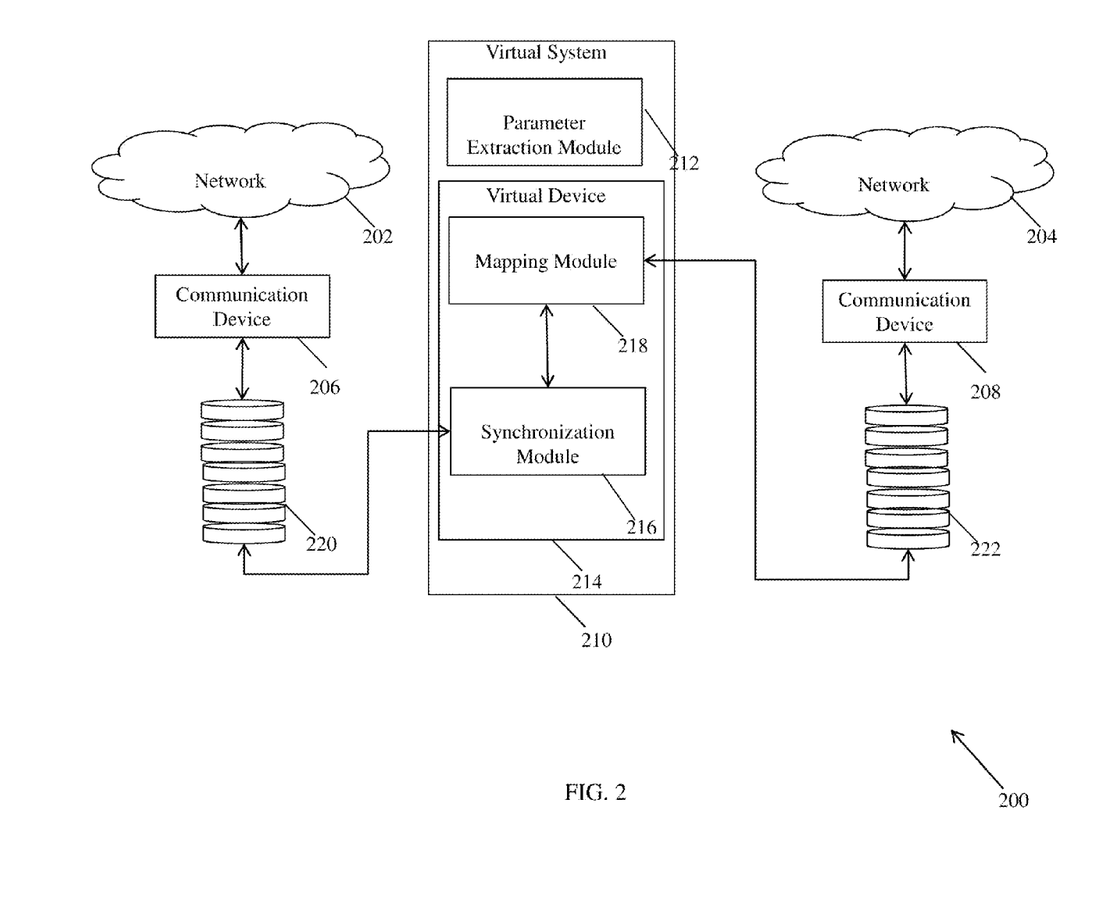
FIG. 2 is a detailed block diagram of the virtual system, in accordance with an embodiment of the present invention.

FIG. 2 is a detailed block diagram of the virtual system, in accordance with an embodiment of the present invention.

In an embodiment of the present invention, as shown in FIG. 2, a first communication device 206 resides in a first network 202 and a second communication device 208 resides in a second network 204. The first communication device 206 follows a protocol which is different from the protocol followed by the second communication device 208. The first communication device 206 interoperates with the second communication device 208 using a virtual system 210. In an exemplary embodiment of the present invention, the virtual system 210 is created by executing a set of program instructions by the microprocessor on the computer system. In an embodiment of the present invention, the virtual system 210 comprises a parameter extraction module 212 and a virtual device 214. The virtual device 214 corresponds to the first communication device 206 of the first network 202.

The parameter extraction module 212 is a software module which is configured to extract one or more parameters corresponding to the first communication device 206. In an embodiment of the present invention, the first communication device 206 is attached to the first network 202 for initiating a communication process. In an exemplary embodiment of the present invention, the first communication device 206 communicates using a particular protocol which has information corresponding to one or more parameters defined in the protocol specification. When the first communication device 206 communicates, the parameter extraction module 212 extracts information related to the one or more parameters. For example, if the first communication device 206 is an image sensor, one or more parameters of the image sensor such as focal length, shutter speed etc. are extracted. In another embodiment of the present invention, the parameter extraction module 212 is configured to monitor the first communication device 206 and extract the one or more parameters when the first communication device 206 initiates communication. In an exemplary embodiment of the present invention, the parameter extraction module 212 operates in communication with the microprocessor on the computer system that executes a set of program instructions.

The virtual device 214 is a software object that corresponds to the first communication device 206 and comprises the one or more extracted parameters of the first communication device 206. In an exemplary embodiment of the present invention, the virtual device 214 may be a JAVA object. The one or more parameters which may be represented as one or more attributes of a Java Object.

In an embodiment of the present invention, the virtual device 214 representing the first communication device 206 comprises protocol specific information related to one or more attributes of the first communication device 206 and protocol specific information related to one or more corresponding attributes of the second communication device 208. Using the protocol specific information of attributes, the virtual device 214 is configured to convert data that flows into the virtual device 214 from the first network 202 into data that can be read by the second communication device 208 and vice versa. Further, the virtual device 214 is configured to perform such conversion in real time such that changes in data related to attributes of the first communication device 206 are reflected in the corresponding data related to attributes of the second communication device 208 inside the virtual device 214. In various embodiments of the present invention, the virtual device 214 performs the aforementioned conversion via a synchronization module 216 and a mapping module 218 in accordance with various embodiments of the present invention.

In an embodiment of the present invention, the synchronization module 216 is a software module which is linked to the application layer of the protocol stack 220 of the first network 202 and communicates with the first communication device 206 via the application layer of the protocol stack 220. The synchronization module 216 receives data which corresponds to one or more attributes of the first communication device 206 via the application layer and sends the received data to the mapping module 218. In an exemplary embodiment of the present invention, the synchronization module 216 may be linked to the application layer of a protocol stack of a Wireless Sensor Network (WSN) via a WSN coordinator which is connected to the Universal Serial Bus (USB) port of the computer system. The synchronization module 216 operates in communication with the microprocessor on the computer system which executes a set of program instructions. In an embodiment of the present invention, the synchronization module 216 facilitates the virtual device 214 to be in constant synchronization with the first communication device 206 and provide updated data related to the attributes of the first communication devices 206 to the mapping module 218. The updated data related to the one or more attributes of the first communication device 206 are therefore made available for the second communication device 208 through the mapping module 218.

In an embodiment of the present invention, the mapping module 218 is a software module which is configured to identify equivalent attributes of the first communication device 206 and the second communication device 208 from amongst the one or more attributes available in the virtual device 214. The mapping module 218 maps the equivalent attributes using the protocol specific information related to the attributes of both the first communication device 206 and second communication device 208 that are predetermined in the mapping module 218. In an exemplary embodiment of the present invention, the mapping module 218 receives data related to an attribute of first communication device 206 from the synchronization module 216. Based on the data received, the mapping module 218 identifies and maps the equivalent attributes automatically. In another exemplary embodiment of the present invention, the equivalent attributes may be identified manually based on data which the mapping module receives from the synchronization module 216. The identified equivalent attributes are then mapped and maintained in the mapping module 218. The mapping module 218 therefore operates in conjunction with the synchronization module 216 to obtain data related to the mapped equivalent attributes of the first communication device 206 and second communication device 208. The data received from the first communication device 206 which corresponds to the mapped equivalent attributes of the first and second communication devices 206 and 208 are then converted.

In another embodiment of the present invention, if the updated data is not available in the mapping module 218, the mapping module 218 signals the synchronization module 216. The synchronization module 216 then synchronizes the virtual device 214 with the first communication device 206 and obtains data related to the equivalent attributes from the first communication device 206.

In an embodiment of the present invention, the mapping module 218 is linked to the application layer of the protocol stack 222 of the second network 204. The converted data is then sent to the second communication device 208 of the second network 204 via the application layer. In an exemplary embodiment of the present invention, the mapping module 218 is linked to the application layer of protocol stack of a BACNet based network via an ethernet port on the computer system. The mapping module 218 operates in communication with the microprocessor on the computer system which executes a set of program instructions.

In an exemplary embodiment of the present invention, the first communication device 206 may be a first image sensor and the second communication device 208 may also be a second image sensor and the various attributes of the first and second image sensors may include, but are not limited to, focal length, shutter speed, mode of operation and on-off state. The various abovementioned attributes may be determined differently by the protocol of the first network 202 and the protocol of the second network 204. The difference may include, but not limited to, the unit which represents the various attributes. If the attribute, for example, is focal length, the first image sensor 206 determines the focal length in 'feet' via the corresponding protocol and the focal length of the second image sensor may be determined in 'meters' via the corresponding protocol. The mapping module 218 identifies the equivalent attribute as 'focal length' for both the first and second image sensors and converts the focal length from 'feet' to 'meters' and therefore facilitates the first and second image sensors to interoperate. In an exemplary embodiment of the present invention, focal length (z) of the first communication device 206 is converted to focal length (y) of the second communication device 208 using the equation mentioned below:

y=3.28083*z, where z is in meters and y is in feet.

Further, the synchronization module 216 is in communication with the first image sensor and provides the mapping module 218 with updated data related to the focal length (i.e. the sensor values). The mapping module 218 converts the updated data in 'feet' to 'meters' in real time for communication with the second image sensor. In another embodiment of the present invention, when the mapping module-218 receives data related to 'focal length' from the second image sensor, the relevant response data related to focal length may not be present in the mapping module-218. In such a case, the mapping module 218 sends a signal to the synchronization module 216 for synchronizing the virtual device 214 with the first image sensor for receiving the relevant response data from the second image sensor.

In another embodiment of the present invention, the virtual device 214 may include one or more mapping modules 218 depending on the number of other communication devices in respective networks with which the first communication device 206 in the first network 202 needs to interoperate. In another embodiment of the present invention, if the first network 202 comprises multiple communication devices then virtual devices 214 are created corresponding to each communication device. One or more mapping modules 218 may then be created inside each virtual device 214, depending on the number of other communication devices in respective networks with which each communication device in the first network 202 needs to interoperate.

Figure 3:
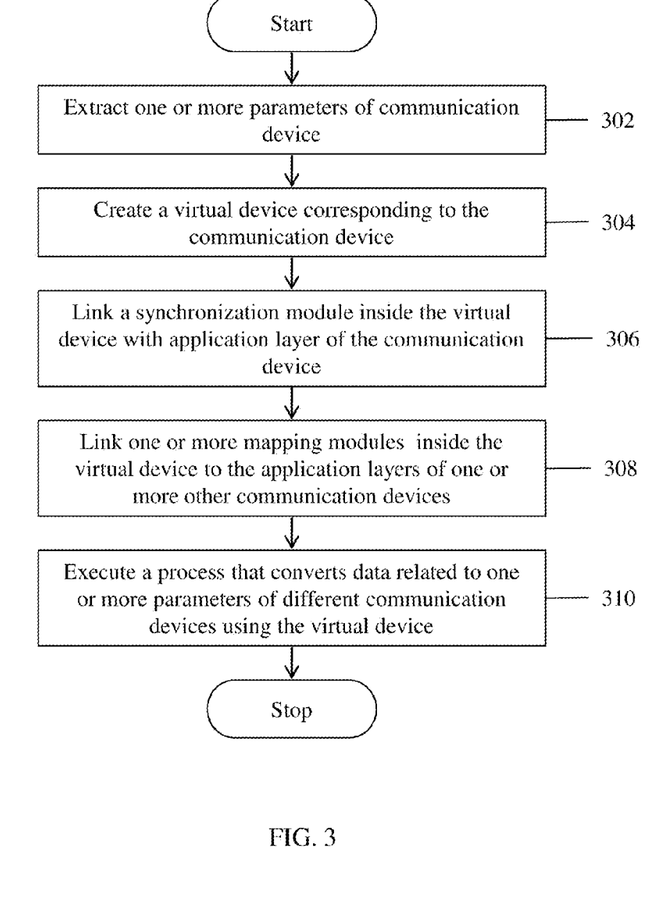
FIG. 3 illustrates a flowchart of a method for facilitating interoperation between communication devices following different protocols via a virtual system, in accordance with an embodiment of the present invention.

FIG. 3 illustrates a flowchart of a method for facilitating interoperation between communication devices of different communication networks by creating a virtual system, in accordance with an embodiment of the present invention.

At step 302, one or more parameters corresponding to one communication device is extracted. In an embodiment of the present invention, the communication device is the device which is required to interoperate with other communication devices in other networks. When the communication device is attached to a network and communication process of the communication device begins, one or more parameters related to the communication device are extracted. In an exemplary embodiment of the present invention, communication device communicates using a particular protocol which has information corresponding to one or more parameters defined in the protocol specification. When the communication device communicates, the information related to the one or more parameters are extracted. For example, if the communication device is an image sensor, one or more parameters of the image sensor such as focal length, shutter speed etc. is extracted. In another embodiment of the present invention, the communication device may be monitored and the one or more parameters may be extracted when the communication device initiates communication.

At step 304, a virtual device corresponding to the communication device is created. In an embodiment of the present invention, virtual device is a software representation of the communication device and includes the one or more extracted parameters of the virtual device. In an exemplary embodiment of the present invention, the virtual device is an object of a Java class (i.e. a JAVA object). The JAVA class has predefined variables that correspond to attributes of the communication device. The values of the predefined variables are in synchronization with the values of the attributes of the real communication device. The Java object, therefore, includes all the extracted parameters of the communication device which are represented as attributes of Java Objects. The virtual device further includes protocol specific information related to the one or more attributes of the communication device. In addition, the virtual device includes protocol specific information related to one or more corresponding attributes of other communication devices. The virtual device therefore comprises protocol specific information related to attributes of the communication device and multiple communication devices that interoperate with the communication device. For example, protocol specific information related to focal length of the communication device may include determining the focal length in 'feet'. Further, protocol specific information related to focal length of another communication device may include determining the focal length in 'meters'.

At step 306, a synchronization module inside the virtual device is linked to the application layer of the communication device. In an embodiment of the present invention, a synchronization module is created in the virtual device which is linked to application layer of the protocol stack of the communication device. The synchronization module is in constant communication with the communication device via the application layer and maintains updated data related to the one or more attributes in the virtual device. In an exemplary embodiment of the present invention, synchronization module extracts values or status of the one or more attributes in the virtual device. For example, the communication device is an image sensor and sensor values are available as output of the image sensor. If the attribute of the image sensor is 'focal length', sensor value may be 'X' feet. The sensor values keep changing and the synchronization module provides such data to the virtual device in real time.

At step 308, one or more mapping modules inside the virtual device of one communication device are linked to the application layers of one or more communication devices. In an embodiment of the present invention, one or more mapping layers are created inside the virtual device and are linked to the application layers of protocols stacks of networks of other communication devices. The one or more mapping modules operate in conjunction with the synchronization module. Further, the one or more mapping modules map equivalent attributes of communication devices using the protocol specific information related to the attributes available in the virtual device. For example, the mapping module maps the attribute 'focal length' of the communication device with the attribute 'focal length' of the one or more communication devices.

At step 310, a process is executed that converts data related to one or more parameters of different communication devices using the virtual device. In an embodiment of the present invention, the one or more parameters are represented as attributes of Java Object in the virtual device. Data related to one or more attributes of the communication device are received by the synchronization module and sent to the mapping module. The mapping module converts the data related to one or more attributes of the communication device into data related to one or more equivalent attributes of other communication devices in real time. Thus, the process when executed facilitates interoperation between different communication devices following different protocols.

Figure 4:
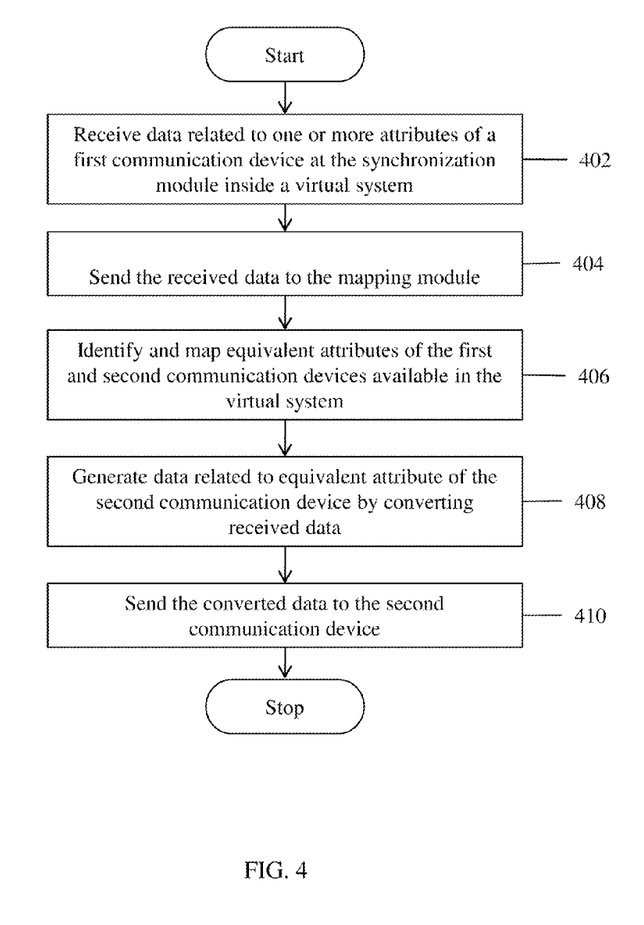
FIG. 4 illustrates a flowchart for converting data of one communication device following a protocol to data of another communication device following another protocol using a virtual system, in accordance with an embodiment of the present invention.

FIG. 4 illustrates a flowchart for converting data of one communication device following a protocol to data of another communication device following another protocol using a virtual system, in accordance with an embodiment of the present invention.

At step 402, data related to an attribute of a first communication device following a first protocol is received at a synchronization module inside the virtual system of the first communication device. In an exemplary embodiment of the present invention, the virtual system comprises a virtual device of the first communication device. The application layer of the network of the first communication device is linked to the synchronization module of the virtual device in the virtual system. Data from the first communication device follows a layered protocol stack that defines the first protocol. After the data passes through the application layer, the data flows into the synchronization module.

At step 404, the received data is sent by the synchronization module to a mapping module inside the virtual system. In an embodiment of the present invention, the synchronization module provides the received data to a mapping module in real time.

At step 406, equivalent attributes of first and second communication devices are mapped from amongst the one or more attributes in the virtual system. In an embodiment of the present invention, attributes related to the first and second communication devices are predetermined at the mapping module. Using the data which is received by the mapping module from the synchronization module, attribute of the second communication device which is similar to the attribute of the first communication device is identified. The attribute of the first communication device is then mapped with the equivalent attribute of the second communication device.

At step 408, data related to the equivalent attribute of the second communication device following a second protocol is generated by converting received data. In an embodiment of the present invention, protocol specific information related to the identified equivalent attribute is stored in the second communication device. Using the protocol specific information of the identified equivalent attribute of the second communication device, the received data related to the attribute of the first communication device is converted to the data related to the equivalent attribute of the second communication device. The generated data is converted to a format defined by the second protocol and therefore readable by the second communication device.

In another embodiment of the present invention, the mapping module may need to signal the synchronization module to receive relevant data from the first communication device. The synchronization module synchronizes the first communication device and the virtual device for receiving the relevant data and making it available in the mapping module.

At step 410, the converted data is sent to the second communication device. In an embodiment of the present invention, the mapping module sends the converted data to the second communication device of the second network via the application layer of the second network. The second communication device, therefore, interoperates with the first communication device.

The present invention may be implemented in numerous ways including as an apparatus, a method, or a computer program product such as a computer readable storage medium or a computer network wherein programming instructions are communicated from a remote location.

Various embodiments of the present invention, may be implemented via one or more computer systems. The computer system includes at least one processing unit and memory. The processing unit executes program instructions and may be a real or a virtual processor. The computer system is not intended to suggest any limitation as to scope of use or functionality of described embodiments. Typical examples of a computer system include a general-purpose computer, a programmed microprocessor, a micro-controller, a peripheral integrated circuit element, and other devices or arrangements of devices that are capable of implementing the steps that constitute the method of the present invention. In an embodiment of the present invention, the memory may store software for implementing various embodiments of the present invention.

The present invention may suitably be embodied as a computer program product for use with a computer system. The method described herein is typically implemented as a computer program product, comprising a set of program instructions which is executed by a computer system or similar device. The set of program instructions may be a series of computer readable codes stored on a tangible medium, such as a computer readable storage medium, for example, diskette, CD-ROM, ROM, or hard disk, or transmittable to a computer system, via a modem or other interface device, over either a tangible medium, including but not limited to optical or analogue communications lines. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A computer-implemented method for facilitating interoperation between communication devices of different networks following different protocols, the computer-implemented method comprising:
creating a virtual device, using program instructions executed by a microprocessor on a computer system, wherein the virtual device is a software representation of current attributes of a first communication device in a first network;
linking, via the computer system, a synchronization module within the virtual device to the first communication device, wherein the synchronization module receives from the first communication device, data representing at least one attribute of the first communication device; and
linking, via the computer system, at least one mapping module within the virtual device to a second communication device, wherein the mapping module facilitates conversion of the attribute data received from the first communication device and transmission of the converted attribute data to the second communication device for facilitating interoperation therebetween;
wherein transmission of the attribute data between the first communication device and the synchronization module and transmission of the converted attribute data to the second communication device uses application layer protocols and bypasses one or more layers below an application layer within communication protocol stacks of the first communication device and the second communication device respectively.

2. The computer-implemented method of claim 1 further comprising:
extracting one or more attributes, by program instructions executed by the microprocessor, of the first communication device; and
representing the one or more attributes of the first communication device, by program instructions executed by the microprocessor, as one or more attributes in the virtual device.

3. The computer-implemented method of claim 1, wherein the mapping module facilitates:
converting, via program instructions executed by the microprocessor, attribute data related to the one or more attributes of the first communication device received from the synchronization module to data related to one or more equivalent attributes of the second communication device; and
transmitting the converted attribute data, via the computer system, to the second communication device, wherein the converted attribute data facilitates interoperation between the second communication device and the first communication device.

4. The computer-implemented method of claim 1, wherein linking the synchronization module within the virtual device to the first communication device comprises linking the synchronization module, via the computer system, to at least one application layer protocol within a communication protocol stack of the first communication device.

5. The computer-implemented method of claim 1, wherein linking at least one mapping module within the virtual device to a second communication device comprises linking the at least one mapping module, via the computer system, to at least one application layer protocol within a communication protocol stack of the second communication device.

6. The computer-implemented method of claim 2, wherein communications from the first communication device are monitored, and the one or more attributes are extracted from one or more communications initiated by the first communication device.

7. The computer-implemented method of claim 2, wherein:
the synchronization module receives attribute data of the first communication device corresponding to at least one of the extracted attributes, and
received attribute data corresponding to each extracted attribute is used to update an attribute representative of such extracted attribute within the virtual device.

8. The computer-implemented method of claim 7, wherein the synchronization module continuously updates attributes of the virtual device with attribute data of the first communication device, such that attribute information of the virtual device is synchronized in real time with attribute information of the first communication device.

9. The computer-implemented method of claim 4, wherein the attribute data is communicated between the first communication device and the synchronization module using the application layer protocols while bypassing protocols within at least one other layer within the communication protocol stack of the first communication device.

10. The computer-implemented method of claim 9, wherein the bypassed at least one other layer within the communication protocol stack of the first communication device includes any one or more of physical layer protocols, data link layer protocols and network layer protocols.

11. The computer-implemented method of claim 5, wherein transmission of converted attribute data between the mapping module within the virtual device and the second communication device is achieved using the application layer protocols while bypassing protocols within at least one other layer within the communication protocol stack of the second communication device.

12. The computer-implemented method of claim 11, wherein the bypassed at least one other layer within the communication protocol stack of the second communication device includes any one or more of physical layer protocols, data link layer protocols and network layer protocols.

13. A computer-implemented method that facilitates converting data of a first communication device in a first network to data of a second communication device in a second network to facilitate interoperation therebetween, the computer-implemented method comprising:
receiving from the first communication device, data representing at least one attribute of an attribute of the first communication device in a first network at a virtual device on a computer system, wherein the virtual device is a software representation of current attributes of a first communication device in a first network;
identifying, by the virtual device, an attribute of the second communication device based on the received data, wherein the attribute of the second communication device is equivalent to the attribute of the first communication device;
mapping, by the virtual device, the identified equivalent attributes;
converting, by the virtual device, the received data related to the attribute of the first communication device to data related to the equivalent attribute of the second communication device, wherein the received data is converted using predetermined protocol specific information related to the equivalent attribute of the second communication device; and
transmitting, by the virtual device on the computer system, the converted data to the second communication device;
wherein transmission of attribute data from the first communication device to the virtual device and transmission of converted attribute data from the virtual device to the second communication device uses application layer protocols and bypasses one or more layers below an application layer within communication protocol stacks of the first communication device and the second communication device respectively.

14. The computer-implemented method of claim 13 further comprising receiving, by the virtual device, updated attribute data related to the attribute of the first communication device.

15. A system for facilitating interoperation between communication devices of different networks following different protocols, the system comprising:
one or more microprocessors that, having executed computer-executable instructions, are configured to:
implement a parameter extraction module configured to extract one or more attributes related to a first communication device in a first network; and
implement a virtual device, wherein the virtual device is a software representation of current attributes of the first communication device and further wherein the virtual device is configured to:
receive from the first communication device, data representing at least one attribute of the one or more attributes of the first communication device;
convert the attribute data received from the first communication device, to data related to one or more equivalent parameters of a second communication device; and
transmit the converted current attribute data to the second communication device for facilitating interoperation between the first communication device and the second communication device;
wherein transmission of the attribute data from the first communication device and transmission of the converted attribute data to the second communication device uses application layer protocols and bypasses one or more layers below an application layer within communication protocol stacks of the first communication device and the second communication device respectively.

16. The system of claim 15, wherein the virtual device is further configured to represent the extracted one or more attributes related to the first communication device as one or more attributes of the virtual device.

17. The system of claim 16, wherein the virtual device comprises a synchronization module, wherein the one or more microprocessors are further configured to implement a synchronization module, the synchronization module is configured to:
receive attribute data related to the one or more attributes of the first communication device from the first communication device; and
send the received attribute data to a mapping module in the virtual device.

18. The system of claim 17, wherein the mapping module, in communication with the one or more microprocessors, is configured to:
receive attribute data related to the one or more attributes of the first communication device from the synchronization module;
identify one or more attributes of a second communication device that are equivalent to the one or more attributes of the first communication device;
map the identified one or more equivalent attributes;
convert the attribute data related to the one or more attributes of the first communication device to data related to the identified equivalent attributes of the second communication device, wherein the data is converted using protocol specific information related to the identified equivalent attributes of the second communication device that are predetermined in the mapping module; and
transmit the converted data to the second communication device.

19. A computer program product comprising a non-transitory computer-readable medium having computer-readable program code stored thereon, the computer-readable program code comprising instructions that, when executed by a computer system, cause the computer system to:
create a virtual device, wherein the virtual device is a software representation of current attributes of a first communication device in a first network;
link a synchronization module within the virtual device to the first communication device, wherein the synchronization module receives from the first communication device, data representing at least one attribute of the first communication device; and
link at least one mapping module within the virtual device to a second communication device, wherein the mapping module facilitates conversion of the attribute data received from the first communication device and transmission of the converted attribute data to the second communication device for facilitating interoperation therebetween;
wherein transmission of the attribute data between the first communication device and the synchronization module and transmission of the converted attribute data to the second communication device uses application layer protocols and bypasses one or more layers below an application layer within communication protocol stacks of the first communication device and the second communication device respectively.

20. The computer program product of claim 19, wherein the computer-readable program code further comprises instructions that, when executed by the computer system, cause the computer system to:
    extract one or more attributes of the first communication device; and
    represent the one or more attributes of the first communication device as one or more attributes in the virtual device.

21. The computer program product of claim 19, wherein the computer-readable program code further comprises instructions that, when executed by the computer system, cause the computer system to:
    convert attribute data related to the one or more attributes of the first communication device received from the synchronization module to data related to one or more equivalent attributes of the second communication device; and
    transmit the converted attribute data to the second communication device, wherein the converted attribute data facilitates interoperation between the second communication device and the first communication device.

22. The computer program product of claim 19, wherein the computer-readable program code further comprises instructions that, when executed by the computer system, cause the computer system to link the synchronization module to at least one application layer protocol within a communication protocol stack of the first communication device.

23. The computer program product of claim 19, wherein the computer-readable program code further comprises instructions that, when executed by the computer system, cause the computer system to link the at least one mapping module to at least one application layer protocol within a communication protocol stack of the second communication device.

24. A computer program product comprising:
    a non-transitory computer-readable medium having computer-readable program code stored thereon, the computer-readable program code comprising instructions that, when executed by a computer system, cause the computer system to:
    receive data representing at least one attribute of an attribute of the first communication device in a first network at a virtual device on a computer system, wherein the virtual device is a software representation of current attributes of a first communication device in a first network;
    identify an attribute of the second communication device based on the received attribute data, wherein the attribute of the second communication device is equivalent to the attribute of the first communication device;
    map the identified equivalent attributes;
    convert the received attribute data related to the attribute of the first communication device to data related to the equivalent attribute of the second communication device, wherein the received attribute data is converted using predetermined protocol specific information related to the equivalent attribute of the second communication device; and
    transmit the converted attribute data to the second communication device;
    wherein transmission of the attribute data from the first communication device and transmission of the converted attribute data to the second communication device uses application layer protocols and bypasses one or more layers below an application layer within communication protocol stacks of the first communication device and the second communication device respectively.

25. The computer program product of claim 24, wherein the computer-readable program code further comprises instructions that, when executed by the computer system, cause the computer system to receive updated attribute data related to the attribute of the first communication device.

* * * * *